United States Patent [19]

Sjöstrand et al.

[11] Patent Number: 4,589,591

[45] Date of Patent: May 20, 1986

[54] JOINT ON PACKING CONTAINERS AND A METHOD AND ARRANGEMENT FOR THE MANUFACTURE OF THE SAME

[75] Inventors: Uno Sjöstrand, Flyinge; Sven Andersson, Åkarp, both of Sweden

[73] Assignee: Tetra Pak International AB, Lund, Sweden

[21] Appl. No.: 552,921

[22] Filed: Nov. 18, 1983

[30] Foreign Application Priority Data

Nov. 24, 1982 [SE] Sweden .............................. 8206680

[51] Int. Cl.⁴ .............................................. B65D 5/42
[52] U.S. Cl. ................................ 229/48 SA; 229/48 T
[58] Field of Search ............. 229/48 SA, 48 SC, 48 T

[56] References Cited

U.S. PATENT DOCUMENTS

| | | | |
|---|---|---|---|
| 2,979,247 | 4/1961 | Pellaton et al. | 229/48 T |
| 3,063,593 | 11/1962 | Kuchenbecher | 229/48 T |
| 3,362,608 | 1/1968 | Dilot | 229/48 T |
| 3,604,613 | 9/1971 | Haas | 229/48 T |
| 3,712,844 | 1/1973 | Ratten et al. | 229/48 T |
| 4,239,150 | 12/1980 | Schadowski et al. | 229/48 T |
| 4,287,247 | 9/1981 | Reil et al. | 229/48 T |
| 4,312,473 | 1/1982 | Hoellek | 229/48 T |

*Primary Examiner*—Joseph Man-Fu Moy
*Attorney, Agent, or Firm*—Burns, Doane, Swecker & Mathis

[57] ABSTRACT

Joints in packing containers of heat-sealable gas-tight laminate are sensitive to deformation, since this often results in a deterioration of the gas-tightness. This is due to the accumulation of melted thermoplastics which is produced during the heat-sealing. This problem is eliminated in that the sealing zone of the joint is given a limited width and is placed at a distance from the edge of the laminate. A method and an arrangement for realizing this comprises a heating zone whose width is limited in relation to the width of the sealing jaws which are used for the sealing together of the material layers.

9 Claims, 5 Drawing Figures

JOINT ON PACKING CONTAINERS AND A METHOD AND ARRANGEMENT FOR THE MANUFACTURE OF THE SAME

BACKGROUND AND SUMMARY OF THE INVENTION

The present invention relates to overlapping joints for gas-tight packing containers of flexible material and to methods for the manufacture of overlapping joints on packing containers of flexible material.

Packing containers of the non-returnable type for liquid contents, e.g. milk, juice, carbonated refreshing beverages or beer are frequently manufactured from laminated, flexible material. The laminated material usually comprises a substantially centrally situated carrier layer of relatively thick cardboard or foamed plastic which is covered on either side by thin, liquid-tight layers of thermoplastic material e.g. polyethylene. The polyethylene layers serve not only as liquid-tight layers but also make possible the heat-sealing of the material. The layers included in the material may vary in respect of type as well as number and thickness, and the material comprises e.g. frequently also a layer of high gas-tightness, e.g. aluminium foil.

When the packing material is to be converted to packing containers, the material is usually subjected to a doubling or reshaping to tubular form so that the opposite edges of the material are made to overlap one another. Subsequently the edges are sealed to one another through heating to such a temperature that the thermoplastic layers in contact with one another melt, whereupon the edge regions are compressed with simultaneous cooling so that a liquid-tight joint is produced. This technique is well-known and has been considered up to now to provide satisfactory joints, but in types of packages where demands made on gas-tightness are very high it has been found that cracks which endanger the gas-tightness may occur, for example when the flexible packing container is handled so that the joints are subjected to stresses. Since even very small cracks, so-called micro-leakage, can imperil the performance of the gas-tight material layer, it is desirable to provide a type of joint in which the risk of micro-leakage has been eliminated.

It is an object of the present invention to provide a joint on gas-tight packing containers which is not subject to the aforementioned disadvantages.

It is a further object of the present invention to provide a joint of the type mentioned in the introduction which can be produced by conventional thermosealing without extensive modifications of technique.

It is a further object of the present invention to provide a joint for flexible material which in spite of deformation of the material retains its tightness and eliminates any risk of micro-leakage.

These and other objects have been achieved in accordance with the invention in that a joint of the type mentioned in the introduction has been given the characteristic that the sealing zone is situated at a distance from the edge of the material facing towards the inside of the packing container. By avoiding any sealing up to the said material edge, the formation of an accumulation of molten thermoplastics along the material edge is avoided, which means that the material retains its flexibility so that bucklings and cracks are avoided on deformation of the sealed material.

The joint in accordance with the invention is combined preferably with a doubling of the edge region of the inner material which has proved to reduce the risk of edge absorption of contents into the material layers at the same time as the risk of leakage on deformation of the joint is not increased.

It is a further object of the present invention to provide a method for the manufacture of a joint on packing containers of flexible material which can be carried out simply and rapidly with packing material and packing machines of a known type.

These and other objects have been achieved in accordance with the invention in that a method of the type mentioned in the introduction has been given the characteristic that the edge regions are compressed at the same time as a bonding agent present between the regions is activated within a portion of this compressed region until a sealing together has taken place.

The method in accordance with the invention makes it possible rapidly and simply to provide a joint in accordance with the invention which is produced in a substantially conventional manner by thermoplastic sealing and without appreciable modifications of the sealing methods customarily used.

It is a further object of the present invention to provide an arrangement for the realization of the above-mentioned method by means of which a joint in accordance with the invention can be produced.

These and other objects have been achieved in accordance with the invention in that an arrangement of the type described in the introduction has been given the characteristic that the one sealing jaw includes a region heating the material which is surrounded on either side by regions not heating the material.

With the help of the arrangement in accordance with the invention the heating and sealing of the overlapping edge regions of the material is made possible within a limited sealing zone which is situated at a distance from the edge of the material facing towards the inside of the packing container. The nonheating regions of the sealing jaw ensure that the width of the sealing zone remains limited at the same time as satisfactory cooling of the material is obtained.

BRIEF DESCRIPTION OF THE DRAWINGS

A preferred embodiment of the joint as well as of the method and the arrangement in accordance with the invention will now be described in more detail with special reference to the enclosed schematic drawing which only shows the components required for an understanding of the invention.

DETAILED DESCRIPTION OF THE PREFERRED EMBODIMENTS

Figure 1A:
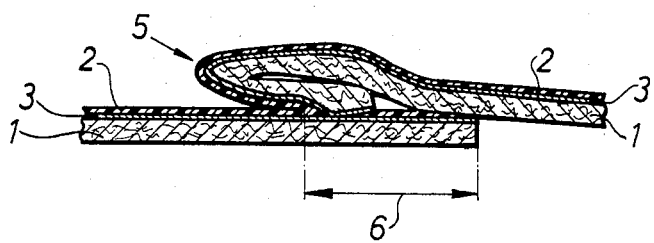
FIG. 1A is an enlarged cross-sectional view of a joint in accordance with the invention.

Packing containers for certain liquid foodstuffs such as juice, wine or beer are often in the form of non-returnable packages which are made of a flexible, gas-tight material. The material usually comprises several different laminated layers, e.g. a relatively thick and rigid carrier layer 1 of paper or foamed plastic material which comprises at least on the side facing the interior (with contents) of the package a layer 2 of liquid-tight thermoplastics, e.g. polyethylene. The carrier layer is often provided with a corresponding layer on the outside so as to provide the package with an outside which is non-sensitive to moisture and which is attractive. A material with an outside layer of thermoplastics, moreover, is easy to seal, since this can be done through heating of the thermoplastic layers to softening or melting temperature and subsequent compression and cooling of the layers so that they are joined together in a liquid-tight seal. This technique is well-known and much used in the package industry, especially in the manufacture of non-returnable packages for liquid foodstuffs.

Packing material which is to be used for the manufacture of gs-tight packages furthermore includes layers adapted to ensure satisfactory gas-tightness. Such a gas-tight layer 3 is appropriately constituted of aluminium foil and is placed between the carrier layer 1 and the thermoplastic layer 2 facing towards the inside of the packing container. This placing means that the gas-tight layer 3 is protected against mechanical damage from outside the package at the same time as it will be possible to provide gas-tight seals. This gas-tight layer 3 (aluminium foil) is sealed to the carrier layer 1 by means of a layer of a suitable bonding agent, e.g. a thin layer of polyethylene, hotmelt or some other heat-meltable material. This sealing layer is very thin and for the sake of clarity has not been included in the drawing.

As mentioned earlier it is relatively simple in packing material which comprises outer layers of thermoplastics to provide liquid-tight seals or joints by means of conventional methods. Gas-tight joints too can be achieved in that one of the two edge zones of the material which are to be sealed to one another are doubled prior to the sealing. As is evident from the drawing, the doubling is done appropriately in the edge zone which is facing towards the inside of the package, that is to say towards the contents, which means that the cut edge of the material is protected from the contents at the same time as the gas-tight layers 3 in the two edge zones are substantially assembled together and can be sealed to each other so that in the joint also the gas-tightness of the material remains unbroken.

Figure 2A:
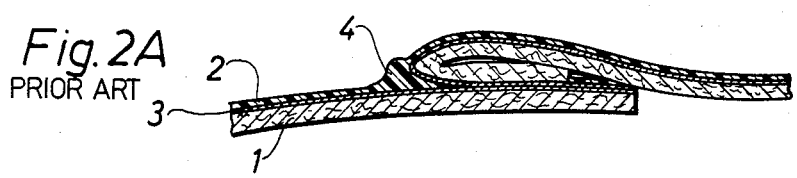
FIG. 2A is an enlarged cross-sectional view of a joint of the conventional type.
Figure 2B:
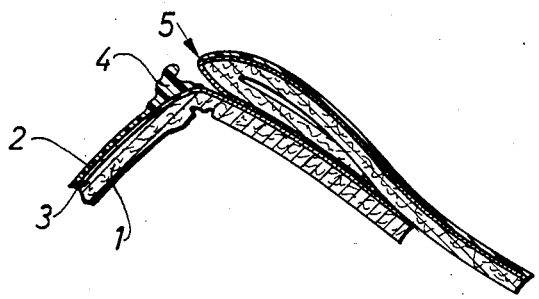
FIG. 2B is a cross-sectional view of the joint in accordance with FIG. 2A when it is subjected to deformation.

In the conventional sealing of a non-folded and a doubled edge zone heat and pressure are applied over a region which fully covers the two overlapping edge zones, that is to say the doubled portion as well as the adjoining regions. During the heating up all the thermoplastic material present within the said region will thus be heated and made to flow from the doubled region, where the pressure between the jaws will be maximum, to adjoining regions of lower pressure. This is illustrated in FIG. 2A which shows a joint realized in the conventional manner where the thermoplastic layers situated between the edge zones have been melted and squeezed out outside the free edge of the doubled edge zone where the thermoplastics forms a longitudinal ridge 4 extending alongside the joint. The two layers 3 of gas-tight material, however, continue to be in good contact with one another in the region of the joint and the gas-tightness of the material is uninterrupted. When a material sealed by using this type of joint is subjected to stresses and bends, however, cracks will appear between the longitudinal ridge 4 of thermoplastics and the free edge 5 of the doubled edge zone (FIG. 2B). This is due to the fact that the doubled edge zone and the ridge 4 of solidified thermoplastic cause two parallel stiffening lines which run along the joint, and on deformation of the material jointly direct the folding in such a manner that it occurs immediately below the edge 5 of the doubled zone where consequently great stresses arise, and ruptures in the thermosplastic layer 2 as well as in the aluminium foil 3 are unavoidable. In the edge 5, of the doubled zone, cracks may also occur, since the thin layer of bonding agent (not shown in the figure), which is present underneath the aluminium foil 3, also melts and endeavours to flow out from the sealing zone. The bonding agent then collects below the aluminium foil 3 along the edge 5 where, depending on the magnitude of the sealing pressure, it may cause stresses on the aluminium foil strong enough to make it crack.

Figure 1B:
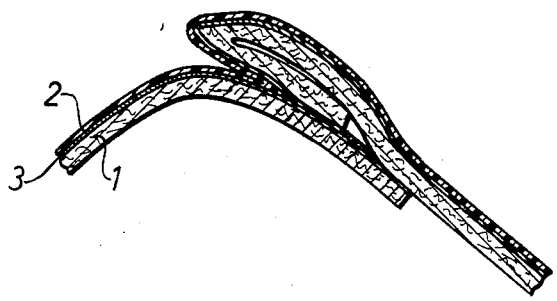
FIG. 1B is a cross-sectional view of the joint in accordance with FIG. 1A when it is subjected to deformation.

In order to prevent such crack formation along the joint, which may occur during fairly normal handling of the sealed materials, the sealing zone 6, wherein the two regions are sealed to one another, has been displaced in relation to the doubled edge zone in accordance with the invention so that the sealing zone 6 is now situated at a distance from the edge 5 of the material facing towards the inside of the packing container. In FIG. 1A, which shows greatly enlarged the joint in accordance with the invention, is illustrated how the distance between the sealing zones 6 and the edge 5 of the material facing towards the inside of the packing container is more than two times the thickness of the material. This displacement of the boundary line of the sealing zone 6 situated closest to the edge 5 means that the layers 2 of thermoplastics situated between the edge zones are not heated to melting temperature in the region at and below the edge 5 during the sealing and consequently are not squeezed out from the space between the compressed edge regions. Neither does the flow in the layer of bonding agent (thermoplastics) between the aluminium foil and the carrier layer mentioned earlier occur to the same extent and the risk of crack formation (bursting) of the aluminum foil layer along the doubled edge 5 is eliminated. As a result the formation of a ridge along the edge 5 is also prevented so that the flexibility of the material is retained. On bending or deformation in accordance with FIG. 1B the stresses are distributed so that the bending takes place within a considerably larger area than in previously known joints of the type shown in FIG. 2. Consequently no concentration of stresses bringing about crack formation in the gas-tight layer 3 is caused, but the latter remains intact even under fairly forcible deformation of the joint.

The joint in accordance with the invention has been described as being carried out appropriately with flexible material comprising outer thermoplastic layers, but it is obvious that the principle and the design of the joint work equally well when the seal is accomplished with the help of any additional agent e.g. hot-melt. The design and the performance of the joint are likewise not affected regardless of whether one or both of the regions are doubled, and the peformance will be equally good even without doubling, provided it is ensured in some other manner that the two gas-tight layers are assembled together in the region of the joint.

The method for the formation of a joint in accordance with the invention differs from the conventional method described previously in that the thermoplastic layer serving as a bonding agent is heated only within a sealing zone 6 of a limited width, which sealing zone, moreover, does not extend up to edge 5 of the edge region which is located inside the packing container. More particularly the joint in accordance with the invention is produced in that the edge regions, one of which may be doubled, are compressed at the same time as bonding agent present between the regions is activated within a portion of the compressed region, until sealing together has taken place. The bonding agent is activated appropriately through heating within the sealing zone 6 which extends at some distance from the edge 5 facing towards the inside of the packing container. The compression of the two edge regions is not limited to the region of the sealing zone 6 but also extends on either side of the sealing zone 6 as well as of the edge regions of the material, thus ensuring that a uniform compression is taking place inside as well as outside the sealing zone 6, as a result of which no appreciable flow of molten thermoplastics will occur from the sealing zone 6. With the preferred type of material described, which comprises a gas-tight layer 3 of aluminium foil it is appropriate, moreover, to heat the thermoplastics within the sealing zone 6 through induction heating which will be described in greater detail in the following.

Figure 3:
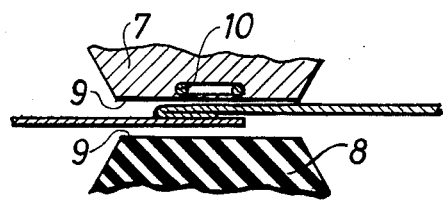
FIG. 3 is a cross-sectional view of a pair of sealing jaws in accordance with the invention directly before the formation of a joint in accordance with the invention.

In FIG. 3 is illustrated schematically an arrangement for the realization of the method in accordance with the invention. The arrangement comprises two manoeuvrable sealing jaws 7,8 suspended in a stand (not shown in the drawing). The sealing jaws are movable to and fro, in a direction towards one another e.g. by means of hydraulic devices, and are provided with plane working surfaces 9 facing towards one another. A little inside of, or on the same level as, the working surface 9 of one of the sealing jaws there is an induction coil 10 located in the sealing jaw which via connection leads, not shown in the drawing, can be joined to an external source of high-frequency a.c. The induction coil defines the region of the sealing jaw 7 heating the material which during the sealing coincides with, and forms, the sealing zone 6. The induction coil 10 or the region heating the material is thus narrower than the edge regions of the materials which are to be sealed to one another and in conformity with the desired sealing zone 6 located at some distance inside the free edge 5 of the inner edge region. As is also evident from FIG. 3 the sealing jaws 7,8 extend with their working surfaces 9 well outside the free edges of the two edge regions so as to ensure a uniform compression of the material in the whole joint region and prevent undesirable flow of molten thermoplastics. The sealing jaw 8 serving as a counter-jaw is made of a resilient material, e.g. rubber, so as to guarantee complete contact over the whole working surface in spite of the varying thickness of the sealed material.

The joint in accordance with the invention together with the method and arrangement for producing the joint allow the joining of laminated packing material which comprises gas-tight layers of aluminium foil with safety against leakage not achieved previously, especially during subsequent handling and deformation of the packing container on which the joint is present. Thus the long-term storage of gas-sensitive liquid foodstuffs in relatively inexpensive non-returnable packages is made possible without any danger of a deterioration of the quality of the foodstuffs.

It is to be understood that the present invention may be embodied in other specific forms without departing from the spirit or essential characteristics of the present invention. The preferred embodiments are therefore to be considered illustrative and not restrictive. The scope of the invention is indicated by the appended claims rather than by the foregoing descriptions and all changes or variations which fall within the meaning and range of the claims are intended to be embraced therein.

What is claimed is:

1. In gas-tight packing coontainers of flexible material of the type having a thermoplastic layer wherein first and second edge regions overlap one another, the improvement comprising a joint having said first edge region doubled upon itself along a first distance extending from a folded edge with said thermoplastic layer of said first edge region overlapping the thermoplastic layer of said second edge region, said joint having a sealing zone where said first and second edge regions are thermally sealed to one another, said sealing zone being spaced a second distance from said folded edge less than said first distance, and an unsealed zone where said first and second edge regions are disconnected from one another, said unsealed zone extending from said folded edge to said sealing zone, whereby upon flexing of said joint said second edge region may undergo displacement away from said folded edge so as to avoid concentration of stress at said folded edge.

2. The combination in accordance with claim 1, wherein the distance from the sealing zone to the folded edge of the material is at least twice the material thickness.

3. The combination in accordance with claim 1 wherein said first edge region overlaps said second edge region on the inside of the container.

4. The combination in accordance with claim 1 wherein said thermoplastic layer is on the inside of the container and said material also has a carrier layer on the outside of the container.

5. The combination in accordance with claim 4 wherein said material includes both of said edge regions and includes an intermediate gas-tight layer.

6. A container joint that is resistant to leakage upon deformation, comprising: flexible container wall material having an inside and outside surface, said material inside surface being formed of a thermoplastic layer and said outside surface being formed of a carrier layer, said material having first and second edges, said material being folded along a fold line parallel to said first edge with a first portion of said carrier layer adjacent said first edge being superimposed on another portion of said carrier layer, said thermoplastic layer adjacent said second edge being overlapped by said thermoplastic layer adjacent said first edge, said overlapping thermoplastic layers being thermally sealed along a sealing zone, said sealing zone extending from said second edge to a location spaced from said fold line, said overlapping thermoplastic layers being unsealed between said location and said fold line, whereby upon flexing of said joint, said overlapping thermoplastic layers adjacent said fold line are free to separate from each other.

7. The container joint in accordance with claim 6 wherein said material includes a gas-tight layer between said carrier layer and said thermoplastic layer.

8. The container joint in accordance with claim 6 wherein said first edge is positioned between said fold line and said second edge, and said sealing zone extends from said first edge to said second edge and from said first edge partway to said fold line.

9. The container joint according to claim 6 wherein the distance between said sealing zone and said fold line is at least two times the thickness of the material.

* * * * *